United States Patent [19]

Schönwald et al.

[11] 4,194,527

[45] Mar. 25, 1980

[54] PRESSURE LIMITING VALVE

[75] Inventors: Siegfried Schönwald; Eberhard Breyer, both of Bad Neustadt; Hans-Georg Trojahn, Saal, all of Fed. Rep. of Germany

[73] Assignee: Siemens Aktiengesellschaft, Berlin & Munich, Fed. Rep. of Germany

[21] Appl. No.: 852,592

[22] Filed: Nov. 17, 1977

[30] Foreign Application Priority Data

Nov. 29, 1976 [DE] Fed. Rep. of Germany ....... 2654077

[51] Int. Cl.² .............................................. F16K 15/06
[52] U.S. Cl. .................................... 137/543; 251/337; 137/514
[58] Field of Search ............ 137/540, 543.15, 543.17, 137/543.13, 539, 514, 542, 543; 251/337

[56] References Cited

U.S. PATENT DOCUMENTS

| | | | |
|---|---|---|---|
| 1,507,448 | 9/1924 | Aldrich | 137/543.15 X |
| 2,564,815 | 8/1951 | Raymond | 137/539.5 |
| 2,927,604 | 3/1960 | Johnson | 137/542 X |
| 3,437,082 | 4/1969 | Bouwkamp et al. | 137/539 X |

FOREIGN PATENT DOCUMENTS

| | | | |
|---|---|---|---|
| 967496 | 11/1950 | France | 137/543.13 |
| 1596326 | 7/1970 | France | |
| 221307 | 9/1924 | United Kingdom | 137/543.15 |

*Primary Examiner*—William R. Cline
*Attorney, Agent, or Firm*—Kenyon & Kenyon

[57] ABSTRACT

A pressure limiting valve having a valve disk which is pressed against a passage opening by the force of a spring braced against an abutment with the valve disk connected to a guide rod which passes through an opening of the abutment and movable relative thereto, the abutment and the guide rod being tilted relative to each other by means which apply a force eccentrically at the abutment and/or the valve disk.

3 Claims, 1 Drawing Figure

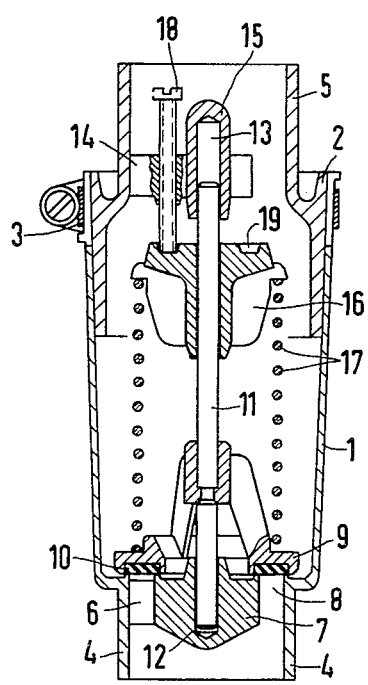

PRESSURE LIMITING VALVE

BACKGROUND OF THE INVENTION

This invention relates to pressure limiting valves in general and more particularly to an improved pressure limiting valve.

Pressure limiting valves having a valve disk which is connected to a rod-like guide member and which is pressed against a passage opening by the force of a coil spring resting against an abutment are known. In a particular valve of this nature shown in the French Pat. No. 1596,326, the valve abutment is supported by a setting screw which applies a force eccentrically to the abutment. The guide member passes through the coil spring as well as the opening in the abutment, the guide member being movably guided in the hole of a holding means fixed to the housing.

It has been discovered that, in such pressure limiting valves, the valve disk tends to oscillate when the flow volume of the medium flowing through the valve changes suddenly. Such oscillations must be damped in a suitable manner in order to avoid damage to the valve. U.S. Pat. No. 2,564,815 teaches a ball valve in which a guide rod is pressed against the sphere closing the valve opening by means of a coil spring. The guide rod itself is guided in two holes which are axially offset with respect to each other. By means of an additional screw, which pushes laterally against the coil spring and thus exerts a transversal force on the it, the guide rod is pushed against the one side wall of the two holes and thereby exerts friction at the hole. This friction damps oscillations which occur.

A design of this nature has various disadvantages. Since the pressure force of the additional screw is transmitted to the guide rod through the coil spring, the guide rod can execute transversal vibrations if the valve is shocked; the guide rod then no longer rests against the side wall of the hole temporarily and the desired friction is no longer produced. In addition, the transversal force exerted on the coil spring by the additional screw must always be separately adjusted in accordance with the response pressure of the valve. This means that the transversal force exerted by the additional screw also must be changed accordingly when the response pressure of the valve is changed by an adjustment of the abutment of the spring. Such special adjustments are very difficult for the valve user and as a result full damping effect is not always achieved.

SUMMARY OF THE INVENTION

It is an object of the present invention to provide a pressure limiting valve of the general type described above in which the damping effect is always fully preserved even when the abutment is adjusted, without additional adjustment measures being required.

According to the present invention this is accomplished by tilting the abutment and guide member relative to each other with friction. Through such tilting of the abutment and guide member, transversal forces are brought about between the two components which lead to a corresponding friction between the abutment and guide member when the valve disks moves. As a result the movement of the valve disk is damped. Since these forces are porportional to the tension of the coil spring the transversal forces are also changed when the abutment is adjusted and as a result an optimum damping effect is always preserved. In one embodiment, this tilting between the abutment and guide member is achieved by means of a setting screw which engages an eccentric depression in the abutment causing the abutment to be tilted relative to the guide member. Furthermore, tilting between the abutment and guide member can also be achieved in a simple fashion by arranging the point of attack i.e., the point where force is applied by the coil spring, at the valve disk eccentrically. It is also been discovered that it is to advantage, for damping the valve disk oscillation, to design the valve disk so that it has two seats. By doing so a smaller valve stroke is possible for the same flow volume and thus a smaller increase of the spring force when valve is opened becomes possible.

BRIEF DESCRIPTION OF THE DRAWINGS

The single FIGURE is a cross-sectional view of the pressure limiting valve of the present invention.

DETAILED DESCRIPTION OF THE INVENTION

As illustrated on the figure, the housing of the pressure limiting valve of the present invention includes a first housing part 1 and a second housing part 2. In the illustrated embodiment, the housing part 2 is pushed into the housing part 1 and the two parts held together by a screw clamp 3. An inlet stub 4 is formed at the first housing part 1 and an outlet stub 5 at the second housing part 2. Disposed within the inlet stub 4 is a cyclindrical intermediate body 7. It is connected with the inlet stubs by means of a plurality of holding arms 6. This arrangement of the intermediate body 7 results in an annular passage opening 8 between the wall of the inlet stub and the intermediate body 7. The annular passage opening 8 is covered by a valve disk 9. Valve disk 9 is connected to a rod 11 which acts as a guide member. The rod 11 has one end seated in a corresponding bore hole 12 of the intermediate body. The other end of the rod 11 extends into a hole 13 of a guide member 15 which is connected to the outlet stub 5 by means of a holding means 14. An abutment 16 is disposed movably on the rod 11. A coil spring 17 is disposed between the abutment 16 and the valve disk 9 engaging the valve disk eccentrically. A setting screw 18 is screwed through the holding member 14 and engages a depression 19 in the abutment, the depression being arranged eccentrically. The abutment 16 is supported by the setting screw 18. Since the setting screw 18 applies a force thereto at the eccentrically arranged depression 19 in the abutment 16, the abutment 16 is tilted relative to the rod 11. When the valve responds, the valve disk 9 is lifted and with it the rod 11. Because of the tilting of abutment 16 relative to the rod 11 friction forces are produced which damp the oscillations of the valve disk 9.

Because of the annular passage opening 8, a two seated valve is obtained. When the valve disk is lifted, a gap is produced both at the inner rim and the outer rim of the annular passage opening. The medium can flow through both of these gaps. As a result, to pass a given flow volume, a smaller valve stroke is required with this two seat valve than would be required with a one seat valve. This in turn improves the damping of the valving oscillations substantially. In the pressure limiting valve according to the present invention, the damping of the valve disk oscillations will not and can not be influenced by dirt particles which may settle in the valve.

As an alternative to the clamp connection shown for connecting the housing parts 1 and 2, a detachable snap-in connection is also possible. Such an arrangement allows the valve to be assembled and disassembled quickly and easily for purposes of cleaning the valve if required. The inlet stub and outlet stub are preferably made with the same dimensions so that the pressure limiting valve can be connected to either the suction side or the pressure side of a compressor. Furthermore, the two seat design of the valve leads to a smaller overall volume of the valve for a given flow volume.

What is claimed is:

1. A pressure limiting valve comprising a valve housing having therein a passage opening; a valve disk for closing said passage opening; a rod shaped guide member attached to said valve disk; first and second means each having a guide passage therein attached to the valve housing for guiding the respective ends of said rod shaped guide member; an abutment disposed about said rod shaped guide member between and spaced from said first and second means for sliding motion thereon; a coil spring disposed between said abutment and said valve disk for holding said valve disk against said passage opening; a setting screw engaging said abutment for adjusting the position of said abutment to determine the operating pressure of the pressure limiting valve; and means causing said guide member and said abutment to be tilted relative to each other such that said guide member slides within said abutment with friction.

2. The pressure limiting valve according to claim 1 wherein said valve disk has an annular shape and wherein said passage opening is also of an annular shape having inside and outside concentric seats, whereby said valve disk and inside and outside seats form a dual seated valve with an inside passage opening and an outside passage opening.

3. A pressure limiting valve according to claim 1 wherein said means causing said guide member and said abutment to be tilted relative to each other comprise said setting screw engaging said abutment eccentrically whereby said eccentric engagement coupled with the force applied to said abutment by said spring will result in a tilting thereof causing said guide member to slide within said abutment with a friction force which will be directly proportional to the force set into said spring by said setting screw.

* * * * *